United States Patent
Fleureau et al.

(10) Patent No.: US 12,143,633 B2
(45) Date of Patent: Nov. 12, 2024

(54) METHOD AND APPARATUS FOR DEPTH ENCODING AND DECODING

(71) Applicant: InterDigital VC Holdings, Inc., Wilmington, DE (US)

(72) Inventors: Julien Fleureau, Rennes (FR); Renaud Dore, Rennes (FR); Franck Thudor, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 275 days.

(21) Appl. No.: 17/440,151

(22) PCT Filed: Mar. 17, 2020

(86) PCT No.: PCT/US2020/023060
§ 371 (c)(1),
(2) Date: Sep. 16, 2021

(87) PCT Pub. No.: WO2020/190898
PCT Pub. Date: Sep. 24, 2020

(65) Prior Publication Data
US 2022/0150543 A1  May 12, 2022

(30) Foreign Application Priority Data
Mar. 20, 2019 (EP) .................................... 19305338

(51) Int. Cl.
*H04N 19/597* (2014.01)
*H04N 19/124* (2014.01)
(Continued)

(52) U.S. Cl.
CPC ......... *H04N 19/597* (2014.11); *H04N 19/124* (2014.11); *H04N 19/162* (2014.11); *H04N 19/184* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 2013/0051458 A1 | 2/2013 | Kitahara et al. | |
| 2014/0269903 A1* | 9/2014 | McCarthy | H04N 19/176 375/240.03 |
| 2018/0286107 A1* | 10/2018 | Hemmer | H04N 19/597 |

FOREIGN PATENT DOCUMENTS

| | | |
|---|---|---|
| CN | 104820981 A | 8/2015 |
| CN | 104820981 B | 10/2017 |

(Continued)

OTHER PUBLICATIONS

Machine-generated translation for CN104820981A, entitled "Image Three-Dimensional Representation Method based on Parallax Hierarchical Segmentation, and System", 15 pages.
(Continued)

*Primary Examiner* — James M Anderson, II
(74) *Attorney, Agent, or Firm* — VOLPE KOENIG (57) ABSTRACT

Methods, device and data stream format are disclosed in the present document for the encoding, the formatting and the decoding of depth information representative of a 3D scene. Compression and decompression of quantized values by a video codec leads to a value error. This error on values is particularly sensitive for depth encoding. The present invention proposes to encode and decode depth with a quantization function that minimize an angle error when a value error on quantized depth creates a location delta between the projected point and the de-projected point. The inverse of such a quantization function has to be encoded in metadata associated with the 3D scene, for example as a LUT, to be retrieved at the decoding, as such functions are not tractable.

14 Claims, 4 Drawing Sheets

(51) Int. Cl.
  *H04N 19/162* (2014.01)
  *H04N 19/184* (2014.01)
  *H04N 19/70* (2014.01)

(56) References Cited

FOREIGN PATENT DOCUMENTS

| EP | 1591963 A1 | 11/2005 |
| EP | 3432581 A1 | 1/2019 |
| EP | 3554074 A1 | 10/2019 |

OTHER PUBLICATIONS

Machine-generated translation for CN104820981B, entitled "A Kind of Image Stereo Representation Method and System that Segmentation is Layered based on Parallax", 35 pages.

* cited by examiner

METHOD AND APPARATUS FOR DEPTH ENCODING AND DECODING

This application claims the benefit, under 35 U.S.C. § 371 of International Application PCT/US2020/023060, filed Mar. 17, 2020, which was published in accordance with PCT Article 21(2) on Sep. 24, 2020, in English, and which claims the benefit of European Patent Application No. 19305338.6, filed Mar. 20, 2019.

1. TECHNICAL FIELD

The present principles generally relate to the domain of three-dimensional (3D) scene and volumetric video content. The present document is also understood in the context of the encoding, the formatting and the decoding of data representative of the geometry of a 3D scene, for example, for a rendering of volumetric content on end-user devices such as mobile devices or Head-Mounted Displays (HMD).

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Recently there has been a growth of available large field-of-view content (up to 360°). Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π steradians, immersive, omnidirectional or large field of view for example.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. The content is created by the means of dedicated sensors allowing the simultaneous recording of color and depth of the scene of interest. The use of rig of color cameras combined with photogrammetry techniques is a way to perform such a recording, even if technical difficulties remain.

While 3DoF videos comprise a sequence of images resulting from the un-mapping of texture images (e.g. spherical images encoded according to latitude/longitude projection mapping or equirectangular projection mapping), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (aka. 3DoF+) restricts the user viewing space to a limited volume called viewing bounding box, allowing limited translation of the head and parallax experience. This second context is a valuable trade-off between free navigation and passive viewing conditions of a seated audience member.

Beyond the specific case of volumetric video, the encoding and decoding of depth information of a 3D scene or a volumetric content may be an issue, especially when the range of depth values to be encoded is large and the bit depth available for the encoding does not provide with a sufficient amount of encoding values.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate to a method for encoding data representative of a distance between points of a point cloud and a first point located within the point cloud. The method comprises quantizing a value representative of a distance between a first and a second point by using a quantization function defined by a third point, a given angle and an error value. The quantization function may be defined such that such that a dequantizing of a sum of the quantized value and the error value generates a fourth point; the angle fourth, third, second point being lower than or equal to the given angle. When the value is quantized, the method encodes this quantized value in a data stream in association with metadata representative of the quantization function. In an embodiment, the quantization function is a parametrized function known by both the encoder and the decoder and, so, the metadata comprise the given angle and/or the error value and/or coordinates of the third point or, in a variant, a distance between the first point and the third point. In another embodiment, the metadata comprise of a look-up table responsive to an inverse of the quantization function.

The present principles also relate to a data stream generated by a device implementing such a method. The data stream comprises data representative of quantized values which are representative of a distance between points of a point cloud and a first point located within the point cloud;

the distances having been quantized by using a quantization function defined by a third point, a given angle and an error value.

The present principles also relate to a method for decoding data representative of a distance between points of a point cloud and a first point within the point cloud. The method comprises decoding from a data stream a quantized value and associated metadata. The metadata comprise data representative of a quantization function defined by a third point, a given angle and an error value. The methods further de-quantizes the extracted quantized value by using an inverse of this quantization function. In an embodiment, the inverse quantization function is a parametrized function known by both the encoder and the decoder and, so, the metadata comprise the given angle and/or the error value and/or coordinates of the third point or, in a variant, a distance between the first point and the third point. In this embodiment, at the decoding side, the inverse quantization function is initialized by these parameters. In variants, some of these parameters are optional if a default value is settled on for one of them. In another embodiment, the metadata comprise a look-up table responsive to an inverse of the quantization function. The distance real values are obtained by looking in the table for the quantized value.

The present principles also relate to devices comprising a processor configured for implementing such methods.

4. BRIEF DESCRIPTION OF DRAWINGS

The present disclosure will be better understood, and other specific features and advantages will emerge upon reading the following description, the description making reference to the annexed drawings wherein.

5. DETAILED DESCRIPTION OF EMBODIMENTS

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

According to non-limitative embodiments of the present disclosure, methods and devices to encode and decode data representative of depth of points of a 3D scene are presented herein. According to the present principles, the depth of a point in a 3D scene is a distance (e.g. Euclidian distance in a Cartesian frame of reference) between this point and a given point, called herein first point or center of projection. A part of a 3D scene to encode are projected onto an image plane relative to the center of projection. A central projection operation is used in association with a mapping operation, for example a sphere mapping projection (e.g. equirectangular projection (ERP) or a Cassini projection or a sinusoidal projection) or a cube mapping projection (according to different layouts of the faces of the cube) or a pyramidal mapping projection. In the context of this disclosure, depth data are quantized and stored as image data, that is as a 2D matrix, an array of pixels. Such images are compressed, transmitted to a decoder which decompresses them.

A point P0 is projected onto the image plane and its depth is stored as a real number (i.e. represented by a floating-point value). Quantization is the process of constraining an input from a continuous or otherwise large set of values (such as the real numbers) to a discrete set, such as an interval of integers, typically between 0 and n. So, quantization introduces a loss of precision when the number of values to quantize is greater than n. At the encoding, a distance d0 is quantized as a value v0 according to a quantization function and at the decoding, the value v0 is de-quantized to a distance d1 according to the inverse quantization function. Then a point P1 is de-projected at distance D1 from the center of projection.

The compression-decompression operation introduces some errors in the quantized values. A quantized value v0 may vault, after compression-decompression, a value v2 between v0−δ and v0+δ where δ=1 or 2 or 10, for example. This value v2 is de-quantized in a distance d2 according to the inverse quantization function. So, instead of point P1, a point P2 is de-projected at distance d2 from the center of projection on a same line passing by the center of projection. The error (d1-d2) depends on the quantization function. Besides, the error of location between P1 and P2 is differently perceived according to the location of a point of view A that they are observed from. Indeed, the angle $\widehat{P_1 A P_2}$ determine the difference of location between P1 and P2 viewed from A. It is, for instance, known that under an angle γ=0.5' (a half an arc minute), called human visual acuity, a human eye cannot distinguish between two distinct points in the 3D space.

According to a non-limitative embodiment of the present principles, data representative of a distance between points of a 3D scene and a first point within the 3D scene are encoded in a data stream. These depth data are quantized by using a quantization function defined according to a second point, a given angle and an error value, such that a difference of the error value between two quantized values leads to an error angle at said second point lower than said given angle. A depth data represents a distance between a point $P_1$ and the center of projection. A difference of an error value (e.g. a difference of 1, 3 or 7) between the quantized value of the depth data for a point P before compression and the quantized value of the same data after decompression leads to a de-projection of this data at a different distance and set a point $P_2$ farer or closer to the center of projection. An error angle at a given point A is the angle $\widehat{P_1 A P_2}$ formed at this given point due to the error value of the quantized value. According to the present principles, the quantization function is determined to guarantee that, for a given second point in the 3D scene, the error angle will not exceed a given angle (selected according to an expected precision) when the error on quantized value is of a given level called error value.

Figure 1:
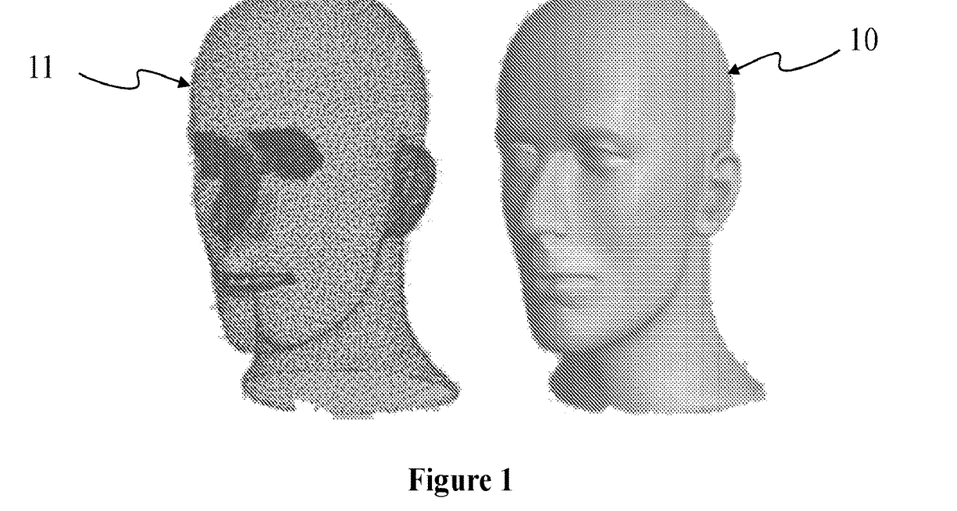
FIG. 1 shows a three-dimension (3D) model of an object and points of a point cloud corresponding to 3D model, according to a non-limitative embodiment of the present principles.

FIG. 1 shows a three-dimension (3D) model 10 of an object and points of a point cloud 11 corresponding to 3D model 10. 3D model 10 and the point cloud 11 may for example correspond to a possible 3D representation of an object of the 3D scene comprising other objects. Model 10 may be a 3D mesh representation and points of point cloud 11 may be the vertices of the mesh. Points of point cloud 11 may also be points spread on the surface of faces of the mesh. Model 10 may also be represented as a splatted version of point cloud 11, the surface of model 10 being created by splatting the points of the point cloud 11. Model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.:
  from a capture of a real object shot by a rig of cameras, optionally complemented by depth active sensing device;
  from a capture of a virtual/synthetic object shot by a rig of virtual cameras in a modelling tool;
  from a mix of both real and virtual objects.

Figure 2:
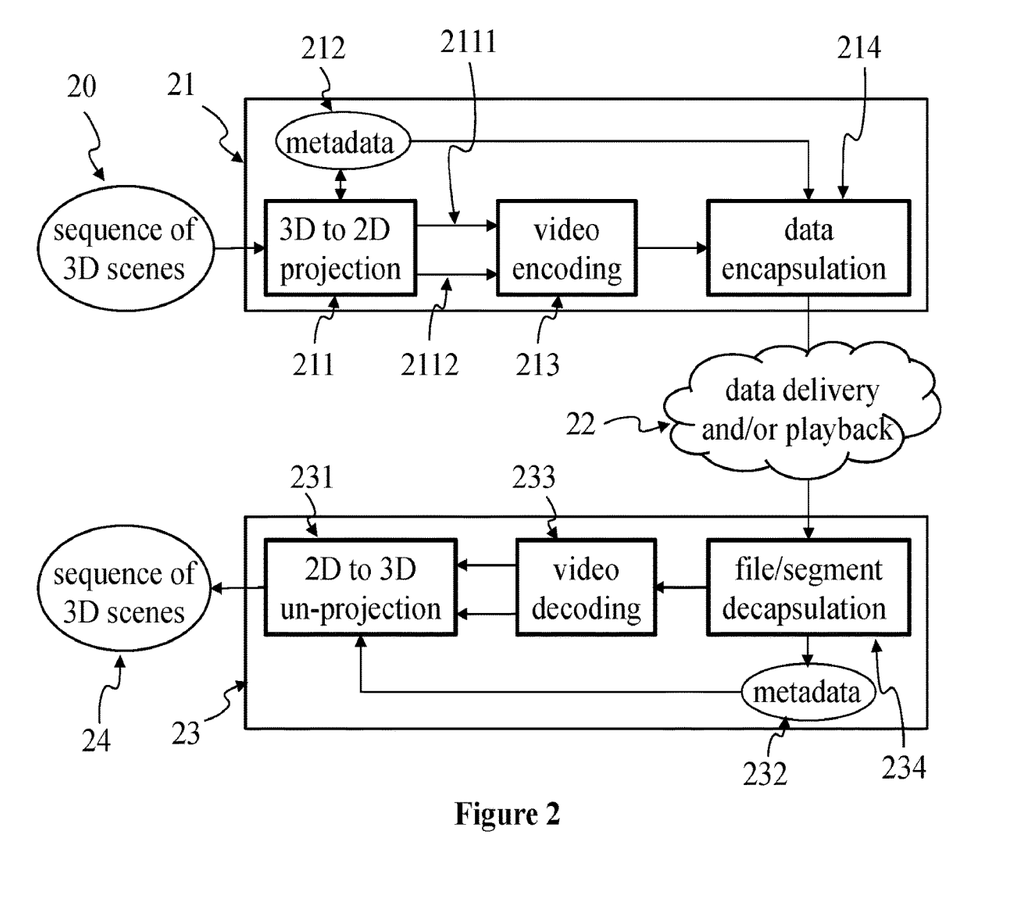
FIG. 2 shows a non-limitative example of the encoding, transmission and decoding of data representative of a sequence of 3D scenes, according to a non-limitative embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes may be provided to a volumetric video rendering device for a 3DoF, 3Dof+ or 6DoF rendering and displaying.

Sequence of 3D scenes 20 is provided to an encoder 21. The encoder 21 takes one 3D scenes or a sequence of 3D scenes as input and provides a bit stream representative of the input. The bit stream may be stored in a memory 22 and/or on an electronic data medium and may be transmitted over a network 22. The bit stream representative of a sequence of 3D scenes may be read from a memory 22 and/or received from a network 22 by a decoder 23. Decoder 23 is inputted by said bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence 20. Frame 2111 comprises depth information representative of the 3D scene projected onto frame 2111. In a variant, color information representative of the color information of points of the 3D scene is also projected and stored in pixels of frame 2111. In another variant, color and depth information are encoded in two separate frames 2111 and 2112. For example, points of 3D scene 10 of FIG. 1 comprise only depth information. No texture is attached to the model, points of the 3D scene have no color component. In any case, the depth information is required to be encoded in a representation of a 3D scene.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7. According to the present principles, metadata comprise information representative of the inverse quantization function used to encode the depth information.

A video encoding circuit 213 encodes sequence of frames 2111 and 2112 as a video. Pictures of a 3D scene 2111 and 2112 (or a sequence of pictures of the 3D scene) is encoded in a stream by video encoder 213. Then video data and metadata 212 are encapsulated in a data stream by a data encapsulation circuit 214.

Encoder 213 is for example compliant with an encoder such as:

- JPEG, specification ISO/CEI 10918-1 UIT-T Recommendation T.81, https://www.itu.int/rec/T-REC-T.81/en;
- AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-Fen);
- 3D-HEVC (an extension of HEVC whose specification is found at the ITU website, T recommendation, H series, h265, http://www.itu.int/rec/T-REC-H.265-201612-lien annex G and I);
- VP9 developed by Google; or
- AV1 (AOMedia Video 1) developed by Alliance for Open Media.

The data stream is stored in a memory that is accessible, for example through a network 22, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD).

Decoder 23 obtains the stream from a source 22. For example, source 22 belongs to a set comprising:

- a local memory, e.g. a video memory or a RAM (or Random-Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

Decoder 23 comprises a circuit 234 for extract data encoded in the data stream. Circuit 234 takes a data stream as input and provides metadata 232 corresponding to metadata 212 encoded in the stream and a two-dimensional video. According to the present principles, metadata 232 comprise information representative of the inverse quantization function to use to retrieve the depth of points of the 3D scene. In the context of the present disclosure, the depth of a point corresponds to a distance between the point to de-project and a center of projection. Coordinates of the center of projection are comprised in the metadata 232 or are defined by default, for example at the origin of the frame of reference of the 3D space of the 3D scene. The video is decoded by a video decoder 233 which provides a sequence of frames. Decoded frames comprise depth information. Due to the compression-decompression process, quantified values of the depth after decoding may differ from the quantized values of the depth at the encoding. In a variant, the decoded frames comprise a depth information and a color information. In another variant, video decoder 233 provides two sequences of frames, one comprising color information, the other comprising depth information. A circuit 231 uses metadata 232 to retrieve the inverse quantization function and de-project depth information and eventually color information from decoded frames to provide a sequence of 3D scenes 24. Sequence of 3D scenes 24 corresponds to sequence of 3D scenes 20, with a possible loss of precision related to the encoding as a 2D video and to the video compression. A 3D scene of the decoded sequence 24 is rendered from a current point of view by projecting the 3D scene onto the image plane of the viewport.

Figure 3:
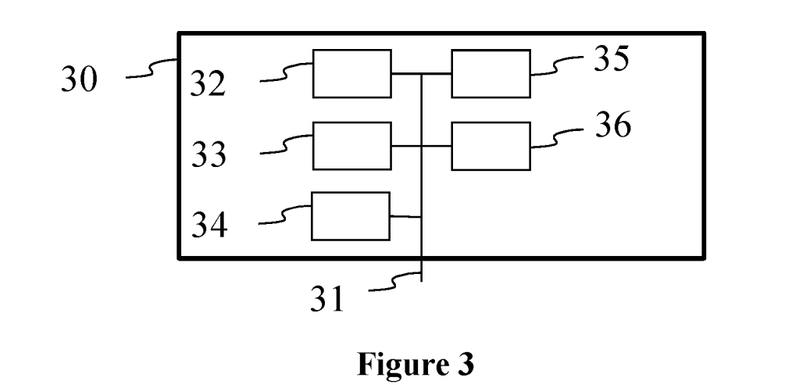
FIG. 3 shows an example architecture of a device which may be configured to implement a method described in relation with FIGS. 8 and 9, according to a non-limitative embodiment of the present principles.
Figure 8:
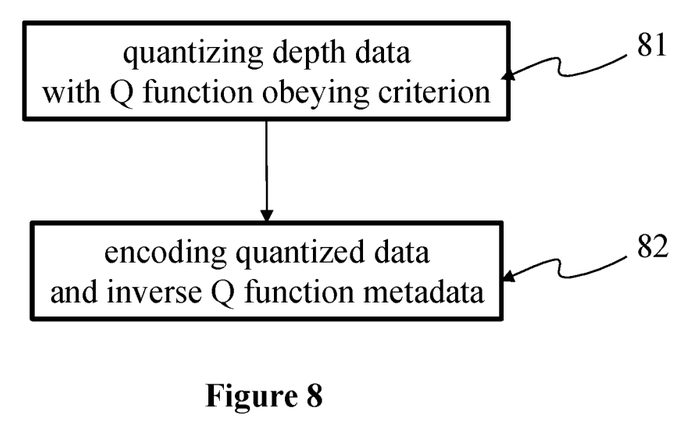
FIG. 8 illustrates a method of encoding data representative of the depth of points of a 3D scene, according to a non-limitative embodiment of the present principles.
Figure 9:
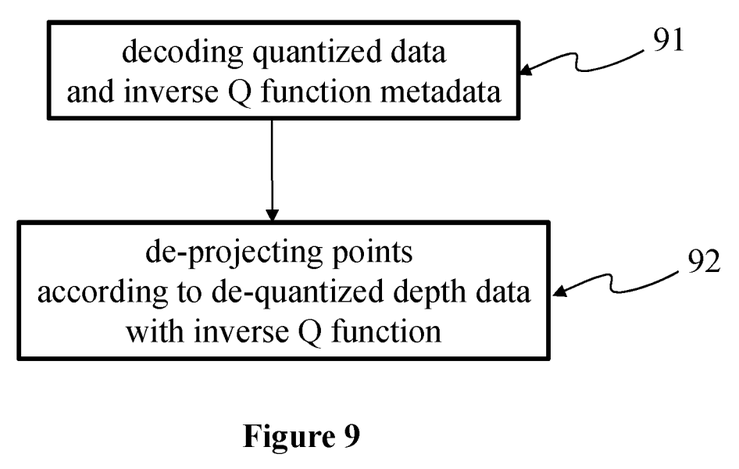
FIG. 9 illustrates a method of decoding data representative of a distance between points of a 3D scene and a first point within the 3D scene, according to a non-limitative embodiment of the present principles.

FIG. 3 shows an example architecture of a device 30 which may be configured to implement a method described in relation with FIGS. 8 and 9. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:

- a microprocessor 32 (or CPU), which is, for example, a DSP (or Digital Signal Processor);
- a ROM (or Read Only Memory) 33;
- a RAM (or Random Access Memory) 34;
- a storage interface 35;
- an I/O interface 36 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device.

Processors also include communication devices, such as, for example, computers, cell phones, portable/personal digital assistants ("PDAs"), and other devices that facilitate communication of information between end-users.

In accordance with examples, the device 30 is configured to implement a method described in relation with FIGS. 8 and 9, and belongs to a set comprising:
 a mobile device;
 a communication device;
 a game device;
 a tablet (or tablet computer);
 a laptop;
 a still picture camera;
 a video camera;
 an encoding chip;
 a server (e.g. a broadcast server, a video-on-demand server or a web server).

Figure 4:
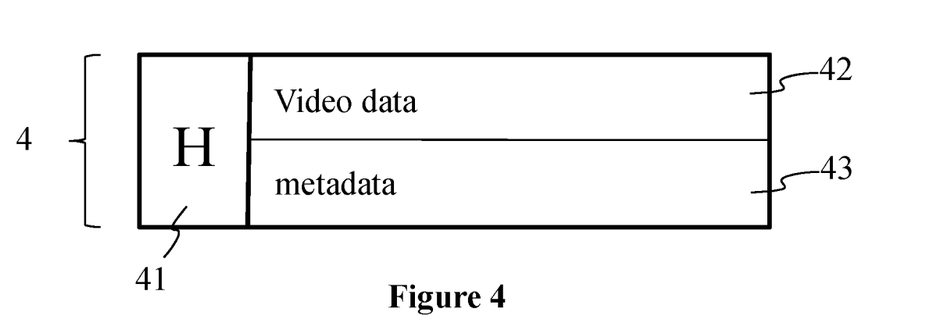
FIG. 4 shows an example of an embodiment of the syntax of a stream when the data are transmitted over a packet-based transmission protocol, according to a non-limitative embodiment of the present.

FIG. 4 shows an example of an embodiment of the syntax of a stream when the data are transmitted over a packet-based transmission protocol. FIG. 4 shows an example structure 4 of a volumetric video stream. The structure consists in a container which organizes the stream in independent elements of syntax. The structure may comprise a header part 41 which is a set of data common to every syntax elements of the stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112. The structure comprises a payload comprising an element of syntax 42 and at least one element of syntax 43. Syntax element 42 comprises data representative of the color and depth frames. Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards).

Figure 5:
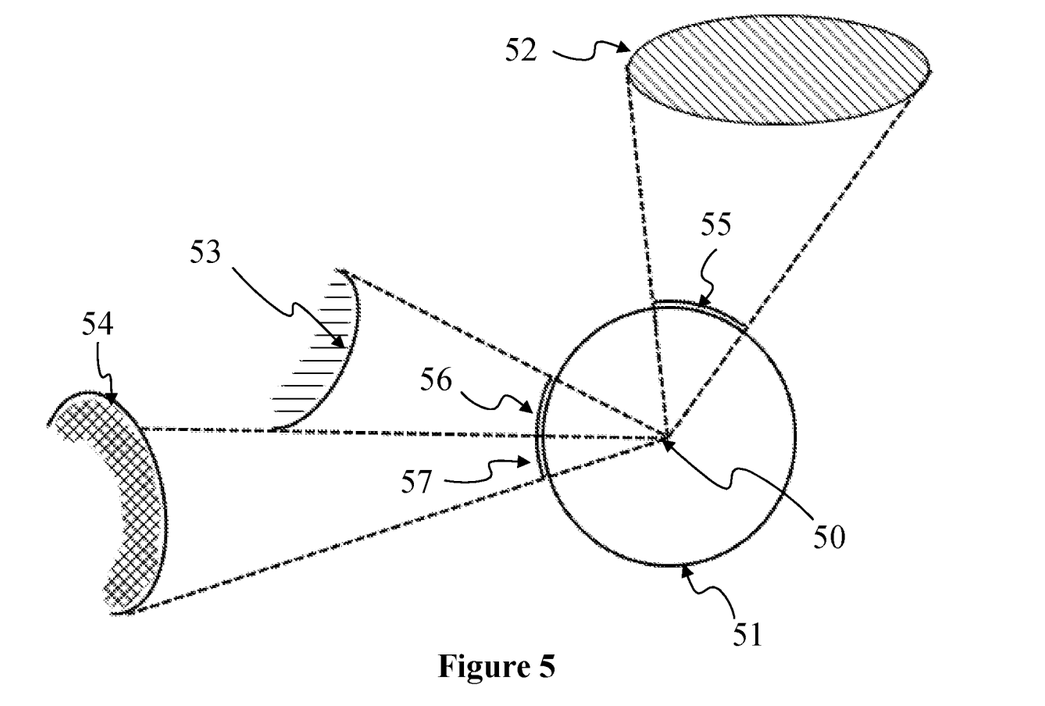
FIG. 5 illustrates a spherical projection from a central point of view, according to a non-limitative embodiment of the present principles.

FIG. 5 illustrates a spherical projection from a central point of view 50. In example of FIG. 5, a 3D scene comprises three objects 52, 53 and 54. Points of object 52 form a surface with a front side and a back side according to point of view 50. Backside points of object 42 are not visible from point of view 50. Points of objects 53 and 54 form surfaces with a front side according to point of view 50. Points of object 53 are visible from point of view 50 but only a part of the points of object 54 are visible from the point of view because of the occultation by the surface of object 53. So, a spherical projection (e.g. EquiRectangular Projection ERP) does not project every point of the 3D scene onto a frame. Numerous other types of projections, like perspective projections or orthographic projections, may be used. For example, points of the point cloud visible from point of view 50 are projected on a projection map 51 according to a projection method. On the example of FIG. 5, the projection method is a spherical projection, for example a latitude/longitude projection or an equirectangular projection (aka. ERP), so the projection map is represented as a sphere 51 on FIG. 5. In a variant, the projection method is a cube projection method, a pyramid projection method or any projection method centred on a point of view 50. Points of the frontside of object 52 are projected in an area 55 of the projection map. Backside points of object 52 are not project as they are not visible from view point 50. Every point of object 53 is visible from point of view 50. They are projected according to the projection method on area 56 of projection map 51. In an embodiment, only a part of points of object 54 is visible from point of view 50. Visible points of object 54 are projected on area 57 of projection map 51. The information stored in pixels of projection map 51 corresponds to a distance between the projected points in the 3D scene and center of projection 50. In a variant, the color component of the projected points is also stored in pixels of projection map 51.

Figure 6:
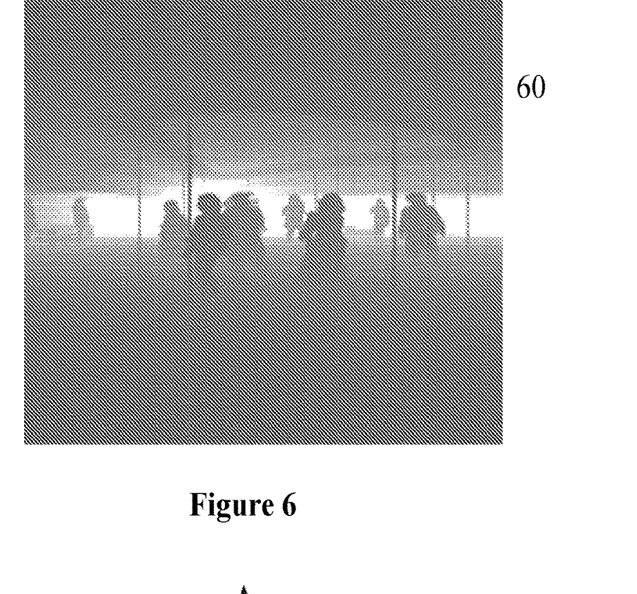
FIG. 6 shows an example of a projection map comprising the depth information of the points of a 3D scene visible from the center of projection (a.k.a. first point), according to a non-limiting embodiment of the present principles.

FIG. 6 shows an example of a projection map 60 comprising the depth information of the points of a 3D scene visible from the center of projection (a.k.a. first point), according to a non-limiting embodiment of the present principles. In the example of FIG. 6, the farer from the center of projection a point of the 3D scene, the brighter the pixel in image 60. The distance to be stored in a pixel of image 60 is quantized in a level of gray, that is in an integer belonging to an interval between 0 and $N=2^n-1$; n being the encoding bit depth (i.e. the number of bits used to encode the integer value, typically 8, 10 or 12 for HEVC codecs). In the example of FIG. 6, depth is coded on 10 bits, thus, a pixel stores a value between 0 and 1023. Depth information goes, for instance in the example of FIG. 6, from $z_{min}=0.5$ meter to $z_{max}=28$ meters. There are more than 1024 different distances and a quantization function has to be used to convert real values in discrete values. An affine transform Eq1 or an inverse function Eq2 are a possible quantization functions to quantize a depth real value z:

$$q_a(z) = 2^n \frac{z - z_{min}}{z_{max} - z_{min}} \qquad \text{Eq 1}$$

$$q_i(z) = 2^n \frac{\frac{1}{z} - \frac{1}{z_{max}}}{\frac{1}{z_{min}} - \frac{1}{z_{max}}} \qquad \text{Eq 2}$$

However, such quantizations are not perceptually consistent but rather scene-driven as intrinsically dependent on $z_{min}$ and $z_{max}$.

Figure 7:
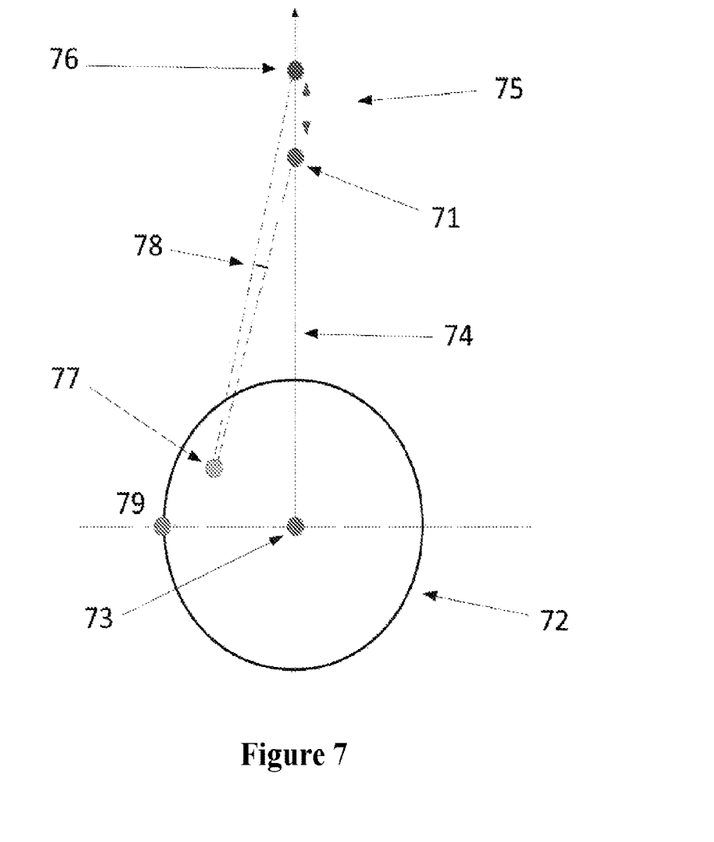
FIG. 7 illustrates how a quantization error is perceived according to a second point of view in the 3D scene, according to a non-limitative embodiment of the present principles.

FIG. 7 illustrates how a quantization error is perceived according to a second point of view in the 3D scene. In the example of FIG. 7, a point 71 is projected onto the image plane of a projection map. Sphere 72 represents a viewing zone, also called viewing bounding box, from which the 3D scene may be seen by a user in the context of a 3DoF+ scenario. Sphere 72 may also represent the projection map. Distance 74, that we call z, between point 71 and first point 73 (i.e. the center of projection) is quantized by a quantization function f and the quantized value v is stored in a pixel of the projection map. The projection map is compressed by an image codec and decompressed at the decoding side as illustrated at FIG. 2. Value v may have been shifted to value v' by this compression-decompression process, for example by plus or minus 1, 5 or 8. The distance between first point 73 and de-projected point 76 is determined by applying the inverse quantization function to value v'. The delta 75 between distance 74 and distance between points 76 and 73 is due to the compression error. Delta 75 depends on the inverse quantization function, and so, on the quantization function. Observed from first point 73, delta 75 is perceivable only in the relation between point 76 and its neighbours, that are surrounding de-projected points. However, observed from another point of the view zone, for instance point 77, delta 75 is perceived for itself because this delta between the location of points 71 and 76 forms an angle 78 pointing on point 77. The bigger angle 78, the bigger the visual artefact generated by the compression error. Angle 78 is called error angle at point 77.

According to the present principles, the quantization function is selected and parametrized in order to keep angle 78 lower than a pre-determine angle γ for a second point in the 3D space. For example, second point 77 or 79 is selected in a viewing zone defined for a given 3DoF+ rendering of the 3D scene. For example, the angle γ is set to a value corresponding to a known human visual acuity around a half an arc minute. The angle γ may be set to any angle value according to the expected robustness of the quantization over an expected compression error level. In this context, depending on the user position in the viewing zone, the associated error angle 78, herein called φ(z), may be null when the user stands at the center of projection but may be significantly greater when he stands in point A. In the example of FIG. 7, the viewing zone is a sphere and it can be demonstrated that the maximum value of φ(z) is obtained at points on the front border of the bounding sphere. This property is important in the case of a zone constrained viewing point (i.e. 3DoF+ rendering), to design a dedicated depth quantization law (i.e. function) which prevent the user from experiencing visual artefacts within the viewing zone. If we call $\phi_{max}(z)$ the maximal value of φ(z) over the viewing zone, then the quantization law should ensure that the associated quantization error enforces $\phi_{max}(z)=\gamma$, where γ is an angle pre-determined for an expected robustness of the quantization function over the compression error level, for instance, the human visual acuity introduced hereinbefore. Doing such a way ensures that no quantization error due to the compression-decompression process will be perceivable from the viewing zone as any associated error angle remains lower than the perceptible threshold. The resulting quantization law only depends on the pre-determined angle γ and on the coordinates of the second point, for example located in the viewing zone. In a variant, instead of coordinates of a second point, the quantization function may depend on a distance from the first point. This is equivalent to define the quantization function according to any point on a sphere centred on the first point, for example point 79 of FIG. 7.

Such a quantization law is not analytically tractable at the optimal position (where $\phi(z)=\phi_{max}(z)$) but a quantization discrete table may be obtained numerically. For instance, a good approximation, for a quantization function that enforces an error angle at point 79 to be lower than a pre-determined angle γ for a value error of 1 (i.e. the decompressed value of a value v is v+1 or v−1), may be obtained, for a point 79 at a distance R from center of projection 73, by Eq3.

$$q_P(z) = \frac{1}{2}\ln(z^2 + R^2) - \frac{1}{\tan(\gamma)}a\tan\left(\frac{z}{R}\right) + K \qquad \text{Eq 3}$$

Where K is a constant that is set so that $q_P(z)=0$ for a maximal pre-determined depth value. The defining of a quantization function obeying these criteria is context dependent. Finding a good candidate for the second point depends on the shape and the size of the viewing zone. The selected function is not always tractable as in the example of FIG. 7. In other words, a parametrizable function has to be known by the encoder and the decoder and, selected parameters at the encoder has to be encoded in the metadata associated with the 3D scene in the formatted stream in order to be retrieved at the decoding side. In another embodiment, a look-up table (LUT) responsive to the inverse quantization function is built at the encoder and encoded in the metadata associated with images representative of the 3D scene. A look-up table is an information associated every values of the quantized value interval to a distance real value. This embodiment has the advantage that the inverse quantization function is not needed to be pre-known by the decoder. The decoder extracts the LUT from the stream and retrieve the real depth from the quantized depth by using this LUT. As the quantization function has been determined to enforce an error angle at the second point (as defined above) to be lower than a pre-determined angle γ for a value error e, the inverse quantization function encoded as a LUT also enforce the same criteria.

In the context of the encoding and decoding of a 3D scene or a sequence of 3D scenes for a 3DoF+ rendering scenario, the present principles have the advantage to guarantee a perceived quantization error lower than a pre-determine level, for example, lower than the human visual acuity, for any point of view within the viewing zone of the scenario.

FIG. 8 illustrates a method of encoding data representative of the depth of points of a 3D scene according to a non-limitative embodiment of the present principles. At a step 81, depth data are obtained from a source and quantized by using a quantization function determined according to a second point, a given angle and an error value, such that a difference of said error value between two quantized values leads to an error angle at the second point lower than the given angle. Depth data are quantized and stored in pixels of an image that is compressed with an image or a video codec. At a step 82, the compressed image is encoded in a data stream in association with metadata representative of the inverse of the quantization function. In an embodiment, the inverse quantization function is a parametrized function known by both the encoder and the decoder. In this embodiment, metadata comprise the angle and/or the error value and/or coordinates of the second point or a distance between first and second point. These metadata are optional if they are pre-determined and known a priori by the decoder. In another embodiment, a look-up table associating every possible quantized value to a distance determined by the quantization function is generated and encoded in the data stream in association with the compressed image.

FIG. 9 illustrates a method of decoding data representative of a distance between points of a 3D scene and a first point within the 3D scene. At a step 91, a data stream encoding data representative of the geometry of the 3D scene is obtained from a stream. A compressed image and metadata representative of an inverse quantization function are extracted from the data stream. The image is decompressed. At a step 92, real values of the depth information comprised in pixels of the decompressed image are retrieve by applying quantized values to the inverse quantization function. Points of the 3D scene are de-projected, that is set at the de-quantized distance from the first point in a direction determined according to coordinates of the pixel in the image and the projection operation used to generate the image. In an embodiment, the inverse quantization function is a parametrized function known by both the encoder and the decoder. Metadata comprise parameters required to initialize the function: the angle and/or the error value and/or coordinates of the second point or a distance between first and second point. These metadata are optional if they are pre-determined and known a priori by the decoder. In another embodiment, the inverse quantization function is encoded as a look-up table in the metadata. Distance real values are retrieved directly from this look-up table according to the quantized values stored in pixels.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding depth of points of a 3D scene, the method comprising:
   obtaining a first point at a center of a viewing zone and a fourth point in the viewing zone;
   quantizing a value representative of a distance between a first and a second point of a 3D point cloud representative of a 3D video content scene by using a quantization function, wherein said quantization function is defined such that an angle between a fourth point within the viewing zone, a second point before quantization and a third point after de-quantization is lower than or equal to a predetermined angle; and
   encoding in a data stream, depth of points of the 3D scene by using the quantization function associated with metadata representative of the quantization function.

2. The method of claim 1, wherein said metadata comprise the predetermined angle and coordinates of the fourth point or a distance between the first point and the fourth point.

3. The method of claim 1, wherein said metadata comprise a look-up table responsive to an inverse of the quantization function.

4. The method of claim 1, wherein the predetermined angle corresponds to a measure of a human visual acuity.

5. A device for encoding depth of points of a 3D scene, the device comprising a memory associated with a professor configured for:
obtaining a first point at a center of a viewing zone and a fourth point in the viewing zone;
quantizing a value representative of a distance between a first and a second point of a 3D point cloud representative of a 3D video content scene by using a quantization function, wherein said quantization function is defined such that an angle between a fourth point within the viewing zone, a second point before quantization and a third point after de-quantization is lower than or equal to a predetermined angle; and
encoding in a data stream, depth of points of the 3D scene by using the quantization function associated with metadata representative of the quantization function.

6. The device of claim 5, wherein said metadata comprise the predetermined angle and coordinates of the fourth point or a distance between the first point and the fourth point.

7. The device of claim 5, wherein said metadata comprise a look-up table responsive to an inverse of the quantization function.

8. The device of claim 5, wherein the predetermined angle corresponds to a measure of a human visual acuity.

9. A method for decoding depth of points of a 3D scene to be rendered from a viewing zone, the method comprising:
decoding from a data stream, at least a quantized value and associated metadata representative of a quantization function, said quantization function being defined such that an angle between a fourth point within the viewing zone, a second point before quantization and a third point after de-quantization is lower than or equal to a predetermined angle; and
de-quantizing the at least a quantized value according to an inverse of said quantization function.

10. The method of claim 9, wherein said metadata comprise the predetermined angle and coordinates of the fourth point or a distance between the first point and the fourth point.

11. The method of claim 9, wherein said metadata comprise a look-up table responsive to an inverse of said quantization function.

12. A device for decoding depth of points of a 3D scene to be rendered from a viewing zone, the device comprising a processor configured for:
decoding from a data stream, at least a quantized value and associated metadata representative of a quantization function, said quantization function being defined such that an angle between a fourth point within the viewing zone, a second point before quantization and a third point after quantization is lower than or equal to a predetermined angle; and
de-quantizing the at least a quantized value according to an inverse of said quantization function.

13. The device of claim 12, wherein said metadata comprise the predetermined angle and coordinates of the fourth point or a distance between the first point and the fourth point.

14. The device of claim 12, wherein said metadata comprise a look-up table responsive to an inverse of said quantization function.

* * * * *